United States Patent [19]
Berndt et al.

[11] Patent Number: 6,122,063
[45] Date of Patent: Sep. 19, 2000

[54] MEASURING DEVICE AND METHOD FOR CONTACTLESS DETERMINING OF THE 3-DIMENSIONAL FORM OF A PERIPHERAL GROOVE IN A SPECTACLE FRAME

[75] Inventors: Dirk Berndt; Christian Steinmann, both of Magdeburg, Germany

[73] Assignee: Fraunhofer-Gesellschaft zur Forderung der angewandten Forschung e.V., Munich, Germany

[21] Appl. No.: 09/402,675

[22] PCT Filed: Mar. 10, 1998

[86] PCT No.: PCT/DE98/00713

§ 371 Date: Dec. 22, 1999

§ 102(e) Date: Dec. 22, 1999

[87] PCT Pub. No.: WO98/45664

PCT Pub. Date: Oct. 15, 1998

[30] Foreign Application Priority Data

Apr. 10, 1997 [DE] Germany ............................ 197 14 929
Jun. 13, 1997 [DE] Germany ............................ 197 25 158

[51] Int. Cl.$^7$ .................................................. G01B 11/24
[52] U.S. Cl. ........................... 356/376; 356/378; 356/372; 356/379
[58] Field of Search ..................................... 356/376, 378, 356/372, 379

[56] References Cited

U.S. PATENT DOCUMENTS 5,760,889  6/1998  Manning .............................. 356/376 X
5,870,191  2/1999  Shirley et al. ....................... 356/376 X
6,043,891  3/2000  Hartrumpf et al. ..................... 356/376

*Primary Examiner*—Frank G. Font
*Assistant Examiner*—Reginald A. Ratliff
*Attorney, Agent, or Firm*—Antonelli, Terry, Stout & Kraus, LLP

[57] ABSTRACT

What is described here is a measuring system for the non-contacting detection of the three-dimensional shape of a groove peripherally extending in a spectacle frame, comprising a light source directing its light beam onto the groove or having its beam deflected thereon by means of an optical deflector system, an optical imaging system which projects the light reflected at the groove onto an optical detector unit and which is disposed in a centered position relative to the groove to be measured on the spectacle frame, a holding means supporting the spectacle frame, which is supported for rotation relative to the light source, the detector system and the optical imaging system about a centering axis of a surface inscribed by the peripheral groove of the spectacle frame, as well as an evaluation unit for determining the three-dimensional shape of the groove, which operates in correspondence with the triangulation principle. Moreover, an appertaining method is proposed.

23 Claims, 6 Drawing Sheets

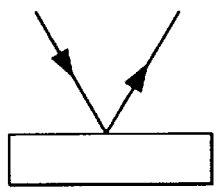
FIG. 4a
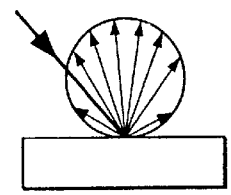
FIG. 4b
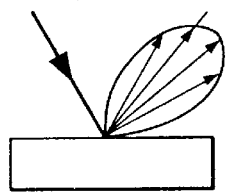
FIG. 4c
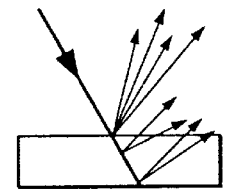
FIG. 4d
FIG. 5a
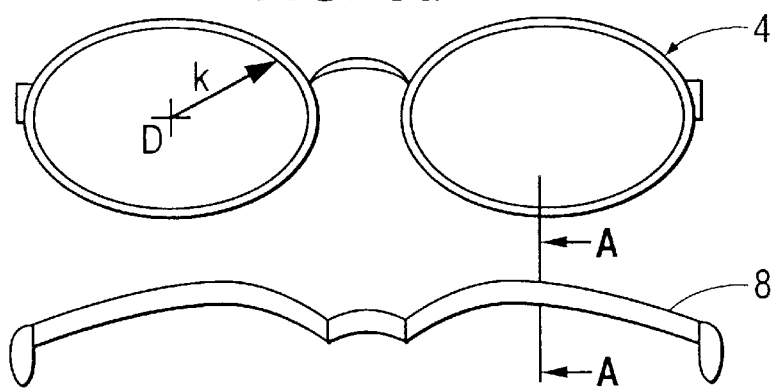
FIG. 5b
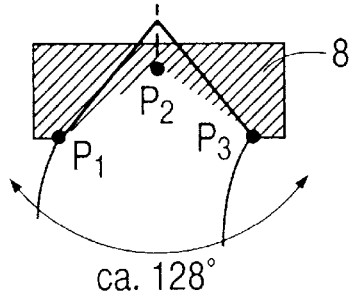

MEASURING DEVICE AND METHOD FOR CONTACTLESS DETERMINING OF THE 3-DIMENSIONAL FORM OF A PERIPHERAL GROOVE IN A SPECTACLE FRAME

This application is a 371 of PCT/DE98/00713 filed on Mar. 10, 1998.

FIELD OF THE INVENTION

The invention relates to a measuring system for the non-contacting detection of the three-dimensional shape of a groove peripherally extending in a spectacle frame, comprising a light whose directing its light beam onto the groove, an optical imaging system which projects the light reflected at the groove onto an optical detector unit and which is disposed in a largely centred position relative to the groove to be measured on the spectacle frame, a holding means supporting the spectacle frame, which is supported for rotation relative to the light source, the detector system and the optical imaging system about a centring axis of a surface inscribed by the peripheral groove of the spectacle frame, as well as an evaluation unit for determining the three-dimensional shape of the groove.

PRIOR ART

In ophthalmic optics measuring devices with tactile measuring sensors are used in the majority of cases for measuring the three-dimensional course of the groove in the frame. For instance a testing device is known from the German Patent DE 41 31 331 for sensing the contour of the openings in spectacle frames or of templates for grinding the periphery of spectacle lenses. The testing device according to the German Patent 41 31 331 consists of a holder for the spectacle frame or the template, a sensing pin which engages into the groove of the opening of the spectacle frame by a sensor head and which can be brought to bear against the periphery of the template, moreover of a straight guide for the sensing pin which is mobile only in the x- and y-directions in parallel with the plane of the opening of the spectacle frame or the temple and which prevents a rotational movement, and finally of a path transducer for the x-direction and a path transducer for the y-direction.

The system described in the German Patent 41 31 331 furnishes, however, only an approximate three-dimensional curve of the frame groove because the detection is performed by physical contact with the rigid sensing body, which may be designed, for instance, as pin or ball, along the frame groove. The three-dimensional curve of the course of the frame groove, which is recorded in this manner, is determined, for example, through the course of a defined point on the testing body. The correct image of all the fine details of the curve proper cannot be detected, and hence the complementary glass facet associated with the groove can be correctly ground or produced only in approximation. Variations in shape between the precise course of the frame groove and the glass facet of the spectacle lens provoke, however, strain in the spectacle lens, which may easily result in a crack or break of the glass. The subject matter of the German Patent 41 31 331 moreover entails the disadvantage that the sensing device for sensing the contour by direct mechanical contact requires a holder for the spectacle frame, which clamps the frame in opposition to the force produced thereon by the sensing device. As a result, the clamping device as such as well as the sensing pin may deform the spectacle frame component, which results in a further inaccuracy in measurement. Furthermore, the tactile measuring devices present the disadvantage that they have been designed only for the detection of the rough course of the frame groove and that they are not suitable to furnish data on the entire three-dimensional geometry of both the frame component as such and the other components of the spectacle frame.

Moreover, sensing devices of the aforedescribed general type are also referred to as tracers involving measuring periods for the detection of the course of the groove in a spectacle frame which range at roughly 12 seconds. During this period 512 shape data is detected and stored for further processing, as a rule. The measuring accuracy amounts to approximately 0.01 mm. What is problematic is the correct recording of the spectacle shape. The devices so far developed are not suitable and in a position to detect the entire spectrum of spectacle shapes. "Extreme" radii or very large 3D shapes, respectively, cannot be measured. Even though the measuring accuracy is sufficient for the glass grinding equipment so far employed milling machines will be used in the future for the adaptation of the glasses, which can be controlled with a much higher precision. The prerequisite for this application is, however, a more precise measurement of the spectacle shapes.

Further examples of spectacle frame detector devices of the aforementioned general type can also be taken from the prior art documents DE 41 07 894 Al, DE 41 28 571 A1 and EP 0 344 725.

In the laid-open German Patent Application 40 19 866 a device is described for sensing and storing the data of an opening of a spectacle frame or a template, which comprises a frame supporting the spectacle frame or the template, a sensing device which senses the opening of the spectacle frame or the template without contacting it, and a transducer of the measured angular values, which detects the angles of rotation of the sensing positions of the spectacle opening or of the template.

The sensing device consists of at least one video scanner system which is arranged at an angle of $0°<\alpha<90°$ relative to the axis of the opening of the spectacle frame or the template, and which is adapted for rotation about this axis as axis of rotation, together with the electronic analysing system and the measuring transducer for the angular values. The video scanner system is moreover disposed for being pivoted relative to the axis of rotation. The pivoting centre for the axis of rotation is located in the plane of the opening of the spectacle frame or the template.

In the subject matter of the laid-open German Patent Application DE-OS 40 19 866 the data detected by means of the video scanner system is converted by an electronic analyser into a three-dimensional curve of the opening of the spectacle frame or the template and/or the possible required glass facet, and is stored for control of an automatic spectacle edge grinding machine.

With the device described in the laid-open German Patent Application DE-OS 40 19 866, however, the three-dimensional shape of the shape of the frame groove and the course of the frame groove, in particular, cannot be detected precisely. The reason for this resides in the fact, inter alia, that the groove walls are disposed at an angle relative to each other so that vignetting effects occur during the optical scanning of the groove walls y the video scanner system which is disposed at an angle relative to the orthogonal axis passing through the spectacle opening.

Another disadvantage of the aforedescribed system is the complex structure which is very expensive in engineering terms, incurs high costs and requires complex controlling and analysing programmes for operation.

Another known device is apparent from the German Patent DE 42 24 640 C2 in which a device is described for the automatic measurement of the shape and the profile of the inside contour of a spectacle mount frame. One preferred embodiment of the device is explained in more details in FIG. 6 with reference to the passage from line 25, column 3 to line 2, column 4 of the description in that prior art document. In particular, two light sources S1 and S2 are provided which emit each parallel and coplanar light beams onto the spectacle groove to be measured and which do not illuminate the groove necessarily in the form of lines. The light reflected back at the spectacle groove is sensed by means of photosensitive means 30 and is evaluated in a way not specified in further details in such a manner that the calculation of the shape and the profile of the inside contour of the spectacle mount frame is said to be possible.

Using the computational method not specified in further details in that prior art reference, it is stated that it were possible in particular to determine the geometric parameters (R1, R2, R3, H1, H2, H3, cf. FIG. 3) of the mount frame. From lines 37 to 42 in column 3 it is evident in particular that the aforementioned geometry parameters can be determined only when the angle $\alpha_3$ or the spacing D between the two points of the light sources S1 and S2 are known. This requires, however, the application of two separate sources of light.

What is a disadvantage in that known device is the use of two light sources which require a precise adjustment of the spectacle frame groove to be measured on both sides, which involves firstly an increased complexity and expenditure for adjustment and secondly the occurrence of sources of faults as a result of a conceivable maladjustment. Moreover, variations in the intensity of illumination of the two light sources may produce a lasting influence on the measurement so that also steps must be taken to ensure that the sources of light can be operated with the same intensity of illumination. This requires a correspondingly high expenditure for closed-loop control.

Eventually, the German Utility Model DE 93 17 381.4 U1 discloses a device for non-contacting sensing of the opening of a spectacle frame by means of a single light source only, but the detection of the inside contour of the spectacle frame groove is based on a measuring principle which allows for the measurement of the spacing by way of interferometric measurement by means of the movement of an optical deflection system. What is inexpedient in this technique is the very long time required for the measuring procedure for the detection of the complete three-dimensional shape of the spectacle frame groove, particularly since several measuring points must be detected for measuring a single sectional profile through the groove, which must be obtained each on an individual basis by appropriate interferometric measuring procedure.

BRIEF DESCRIPTION OF THE INVENTION

The present invention is based on the problem of proposing a measuring system as well as a method for the non-contacting detection of the three-dimensional shape of a groove peripherally extending in a spectacle frame, in such a form that the inside contour of the groove of a spectacle frame can be precisely determined without entailing the disadvantages described in the discussion of prior art. From an engineering point of view the measuring system should be designed as simple as possible, with a maximum of savings in costs. The method is intended to furnish a precise set of data on the three-dimensional characteristics of the groove.

In accordance with the present invention a measuring system for the non-contacting detection of the three-dimensional shape of a groove peripherally extending in a spectacle frame, comprising a light source directing its light beam onto the groove, an optical imaging system which projects the light reflected at the groove onto an optical detector unit and which is disposed in a largely centred position relative to the groove to be measured on the spectacle frame, a holding means supporting the spectacle frame, which is supported for rotation relative to the light source, the detector system and the optical imaging system about a centring axis of a surface inscribed by the peripheral groove of the spectacle frame, as well as an evaluation unit for determining the three-dimensional shape of the groove is so configured that the source of light will illuminate the groove with a single beam of linear configuration, that an optical deflector system is provided which deflects the light beam from the light source onto the groove in such a way that the linear beam is directed largely orthogonally onto the surface inscribed by the peripheral groove in the spectacle frame, and that the light source and the detector system enclose a triangulation angle relative to the groove to be measured, which can be invariably pre-determined, so that the application of the light section technique will be possible for the detection of the three-dimensional shape of the groove.

The spectacle frame to be measured is scanned without contact along the inside contour by means of the linear light beam, using the inventive measuring system, such that mechanical pressing forces, which occur in prior art as described above and which cause a deformation of the spectacle frame, will not occur.

The measuring system preferably comprises a CCD measuring camera as detector unit, which is provided with a pixel array arranged in the form of a matrix so that radiation detection with local resolution will be possible. Moreover, a laser projection system is provided, apart from a turntable as holding device.

On account of the fact that the opening of the spectacle frame varies between 18 mm at minimum and 60 mm at maximum for the opening width it is necessary to dispose the CCD measuring camera and the laser projection system outside the measuring space proper, i.e. outside the opening of the spectacle frame to be measured. For the detection of the contour of the spectacle frame groove by means of this system it is appropriate to use an optical deflector unit right inside the opening of the spectacle frame, which deflects the laser light directly onto the groove. The radiation field which is suitably obliquely incident on the groove illuminates the groove in a narrow linear area, the so-called light section, on which the light is reflected. The light plane of the light section is ideally rotated only about the axis of rotation of the system. The light reflected on the groove is incident on an appropriately positioned optical imaging unit which is preferably arranged in a largely centred position relative to the opening of the spectacle frame, and which deflects the light to the CCD matrix camera.

The light section method which can be implemented with this measuring system makes use of the principle of triangulation which will be briefly explained with reference to FIG. 2. A laser source L projects a line of light onto the spectacle contour to be measured, which is illustrated in FIG. 2 as general measuring object M. The reflection of the line of light is detected by a CCD matrix camera CCD which is mounted at a triangulation angle $\gamma$ relative to the laser.

The real distances of individual local points located on the groove can be determined on the basis of the light section through the spectacle frame groove, which is projected onto the image plane of the CCD matrix camera, through the relationship constituting the basis of triangulation:

$$\Delta x = \frac{b}{z}\sin\gamma \cdot \Delta z$$

wherein:
  Δx relative distance of two groove points in the detector plane
  Δz relative distance of two groove points on the real groove contour
  b/z imaging scale
  z distance of the object between the so-called working point A and the groove
  γ angle of triangulation With the projection of a single light section only a two-dimensional detection of the image of the groove profile is obtained, which will have been illuminated by the linear radiation field.

The measurement of a three-dimensional shape of the complete groove requires a relative movement between the light section sensor, i.e. the light source and the detector system with optical imaging systems, and the measured body, i.e. the spectacle frame groove. To this end either the spectacle frame or the described measuring system is rotated through a defined angle about an axis of rotation after each measuring scan, which angle must be known, in addition to the position of the axis of rotation, for a reconstruction of the spectacle contour.

BRIEF DESCRIPTION OF THE DRAWING

The invention will be described in the following, without any restriction of the general inventive idea, by exemplary embodiments with reference to the drawing which explicit reference is made to with respect to the disclosure of all inventive details which are not explained in more details in the text, by the way. In the drawing:

FIGS. 4a–4d illustrate the types of reflection,

FIG. 5 shows the spectacle frame with a V-groove

BRIEF DESCRIPTION OF EMBODIMENTS

Figure 1A:
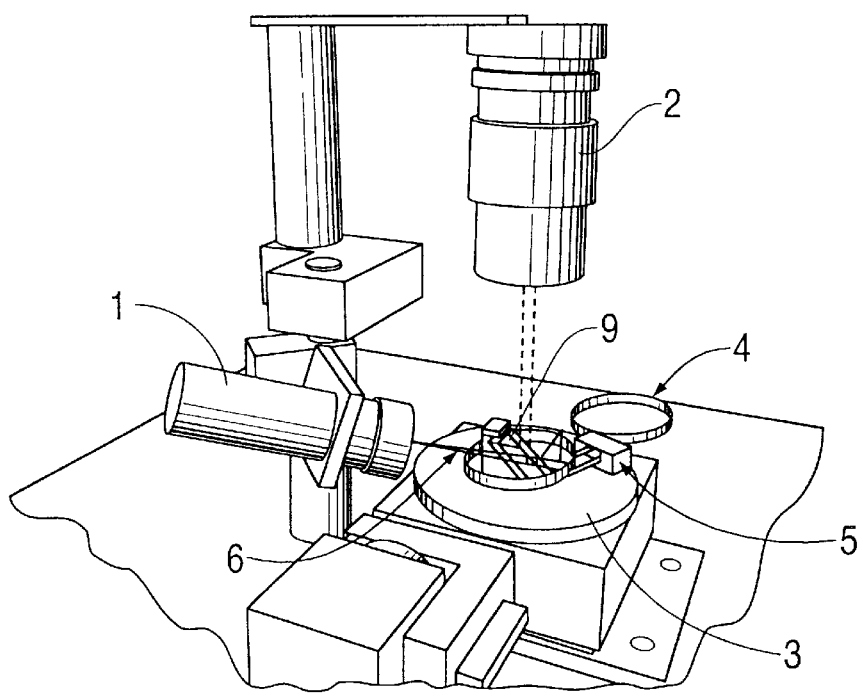
FIG. 1a shows the measuring system.
Figure 1B:
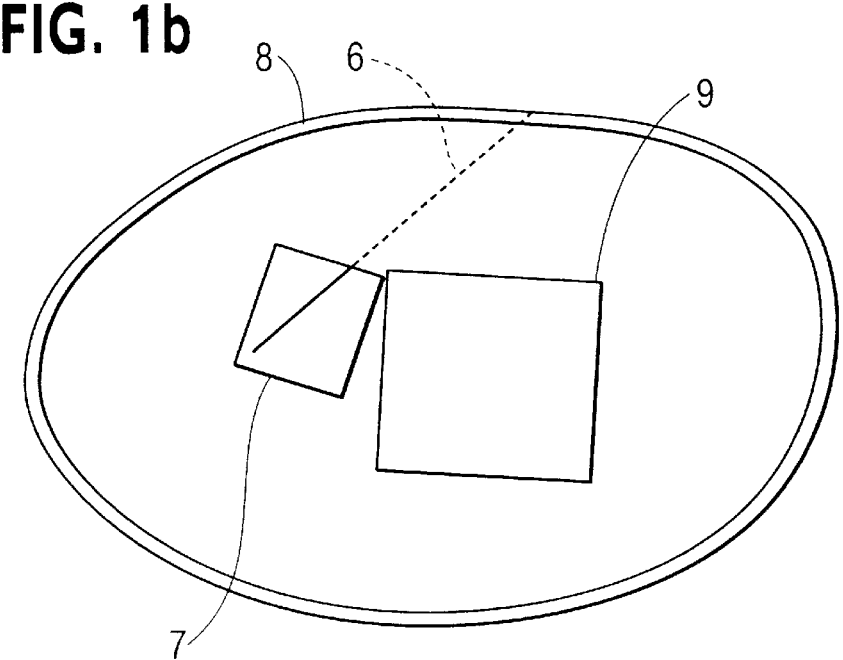
FIG. 1b is a detail representing the arrangement of the optical imaging system.
Figure 1C:
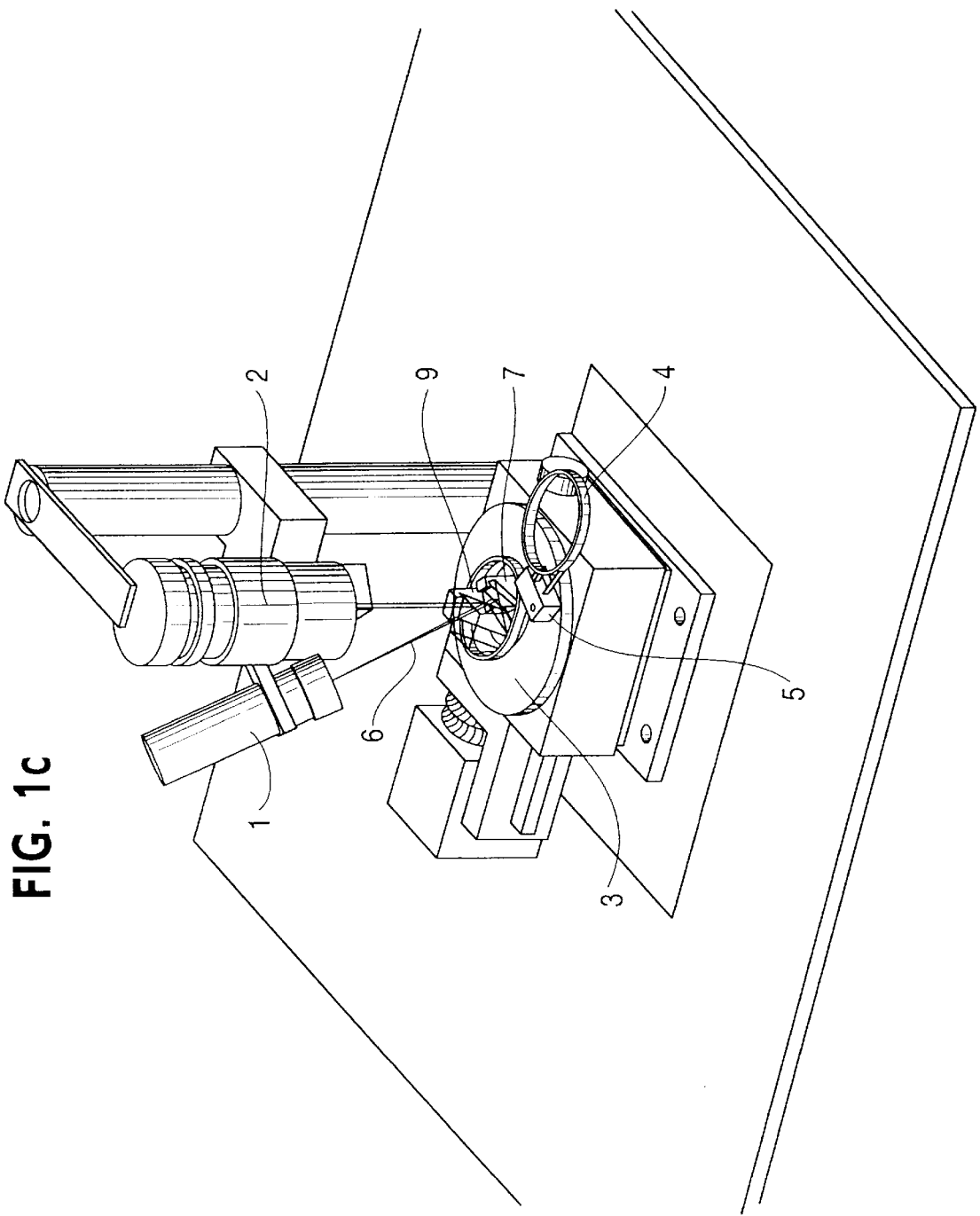
FIG. 1c shows a variant of a measuring system.
Figure 2:
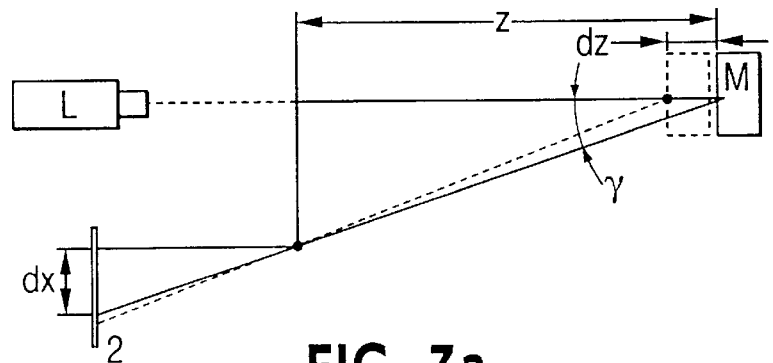
FIG. 2 illustrates the triangulation principle.

FIG. 1a illustrates an expedient embodiment of an inventive measuring system comprising a source of light 1, a detector unit 2 as well as a holding device 3 configured as turntable. A spectacle frame 4 is mounted on the holding device 3 by means of a fixing device 5 such that the inside of the spectacle groove is freely accessible for the light beam 6. In the embodiment illustrated here, the light source 1, which is designed as a laser, is disposed at an angle relative to the opening of the spectacle frame, so that the light beam 6 will be incident directly on the inside of the groove of the spectacle frame 4 with oblique incidence. Other arrangements of the light source 1 are, of course, conceivable as well. In accordance with FIG. 1b, for instance, the light beam 6 may be initially adjusted to be incident on an optical deflector system 7 which deflects the beam to the spectacle frame groove 8. A separate imaging system 9 deflects the light reflected or scattered by the groove to a detector unit which is not illustrated in FIG. 1b. FIG. 1c shows a respective measuring system in a perspective view, with reference numerals being included which are equal to the numerals so far used so that they need not be explained here again.

Furthermore, arrangements are conceivable in which the deflecting system 7 and the imaging system 8 are designed as a single unit. To this end, however, the reflecting surface of the imaging system must have a sufficient size so that both the light beam 6 and the reflected image of the groove may be detected by the imaging system and then undergo an appropriate deflection. Highly reflective surfaces or 90° deflecting prisms are particularly well suitable.

In the aforedescribed device laser light is used for projection, as has been mentioned before already. The application of laser light presents substantial advantages such as a higher light power density, an improved focusability, and the possibility to shutter out the environmental light by means of an interference filter.

The optical deflecting or imaging systems are kinematically decoupled from the rotating holding means and are in rest position. In this manner it is ensured that the groove in the spectacle frame, which rotates relative to the path of the beam, will be completely illuminated.

The light beam 6 has a linear configuration and presents the lowest beam divergence possible for an increase of the illuminance and for an increase of the image resolution linked up therewith. With advanced spectacle frames in particular presenting a substantial deflection in a direction orthogonal to the plane of the area inscribed by the peripheral spectacle groove, additional measures must be taken to ensure that the light beam will follow the vertical deflection of the spectacle frame. To this end a sensor must be provided which is not illustrated in FIG. 1a and which detects the extension of the spectacle frame and traces the light beam accordingly. This is most simply realised with a motorised control of the deflecting system.

Figure 3A:
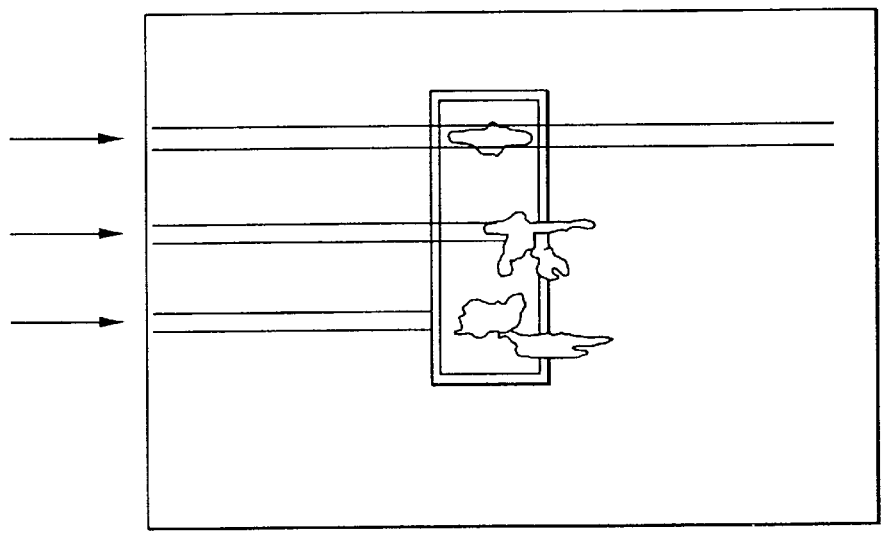
FIG. 3a shows the detection of a groove contour on a metal frame.
Figure 3B:
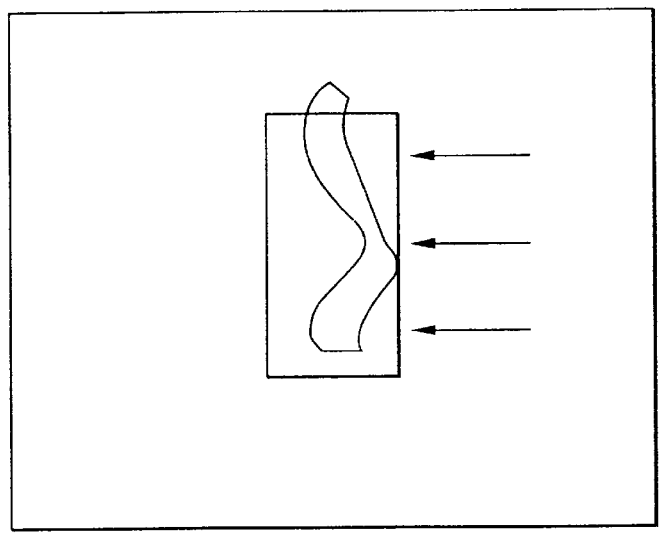
FIG. 3b represents the detection of a groove contour on a plastic frame.

In an evaluating or analysing unit, which is not illustrated in FIG. 1a either, the images of the individual sections recorded of the spectacle frame groove are evaluated. Examples of images of a groove are illustrated in FIGS. 3a and 3b. FIG. 3a shows a section taken through a metal frame whilst FIG. 3b is a sectional view taken through a spectacle frame made of a synthetic material. The respective boxed areas are intended to show the analysable section for each sectional image recorded.

The sectional image or the sectional line between the spectacle frame and the light or laser plane will be referred to as contour section line in the following. The illustrated measuring images of metal and synthetic spectacles have shown that a differentiated evaluation of the images is necessary on account of the different properties of reflection of the different technical surfaces.

On principle, however, the shape of the contour section line is equal for both materials, as becomes evident from FIGS. 3a and 3b in which the contour of the groove can be roughly recognised (cf. the arrows).

The following FIGS. 4a to d are intended to render the reflection events clearer which occur on the groove surface.

FIG. 4a shows an object having a reflecting surface. The incident light beam is reflected in a specular manner. The direction of reflection depends on the orientation of the light relative to the surface. The detection of the light is problematic because the light beam hits the aperture of the measuring camera only in a very small measuring area.

FIG. 4b shows the ideal case with a uniform scattering of the light. The beam power is homogeneously distributed in all directions in space. FIG. 4c shows the case which is relevant for the measurement on metal surfaces, a radiation lobe oriented along the imagined direction of reflection. The half width of the angle of this radiation lobe depends on the surface structure of the object. The rougher a surface, the wider will be the radiation lobe. In accordance with FIG. 4d the light beam penetrates into the material. This case occurs with synthetic materials. The light is scattered in the zone of the penetration depth. An analysis is possible, as is illustrated by FIG. 3b.

After each recording of the respective measuring image the contour points must be prepared for further processing in correspondence with the material. The measuring window is scanned by lines to detect intensity edges for the different materials. When precisely two edges $Fl_1(z)$ and $Fl_2(z)$ are found in one line the value $F_M(Z)$ is generated and stored for further processing.

$$F_M = \frac{k_{M1} Fl_1(z) + k_{M2} Fl_2(z)}{2}$$

The factors are $k_{M1} \approx 1$ and $k_{M2} \approx 1$ for materials displaying a metallic reflection. For synthetic surfaces a search is performed, too, for two edges per image line. However, the factors are here $k_{M1} \approx 2$ and $k_{M2} \approx 0$. The precise values of $k_{M1}$ and $k_{M2}$ are specific of the material and dependent on the degree of reflection and absorption of the spectacle frame. They can be determined by trial and error in order to improve the measuring accuracy. It is only with this differentiated processing of the various materials that a robust measurement can be implemented. This type of processing is equally an improvement over conventional processing algorithms.

The stored information furnishes a binary image. In the next step the complete section contour must be extracted from this image.

The following considerations start out from the condition that the spectacle frame groove resembles a V-shape or can be defined by a polynomial function of the fourth order, respectively. This case is illustrated in FIG. 5. Using the aforedescribed light section technique, the spectacle frame 4 is illuminated along the section A—A for a measuring take. In an idealised case, the groove 8, which is shown in a cross-sectional view in the Figure, presents a V-shaped cross-section which can be described by the points $P_1$, $P_2$ and $P_3$. The points $P_1$ and $P_3$ characterise the groove edges whilst $P_2$ defines the bottom of the groove. In the illustrated example the V-groove presents an angle of 120° in typical cases.

It has become apparent that for a complete definition of the contour section line substantially as little as 3 measuring points are required. For the extraction of the measuring pints a polynomial function of the fourth order is generated by regression from the points $P_1$, $P_2$ and $P_3$. The section contour can be reproduced in an optimum manner by a polynomial of the fourth order:

$$p_i = a_o + a_1 x_i + a_2 x^2_i + a_3 x^3_i + a_4 x^4_i$$

Figure 6:
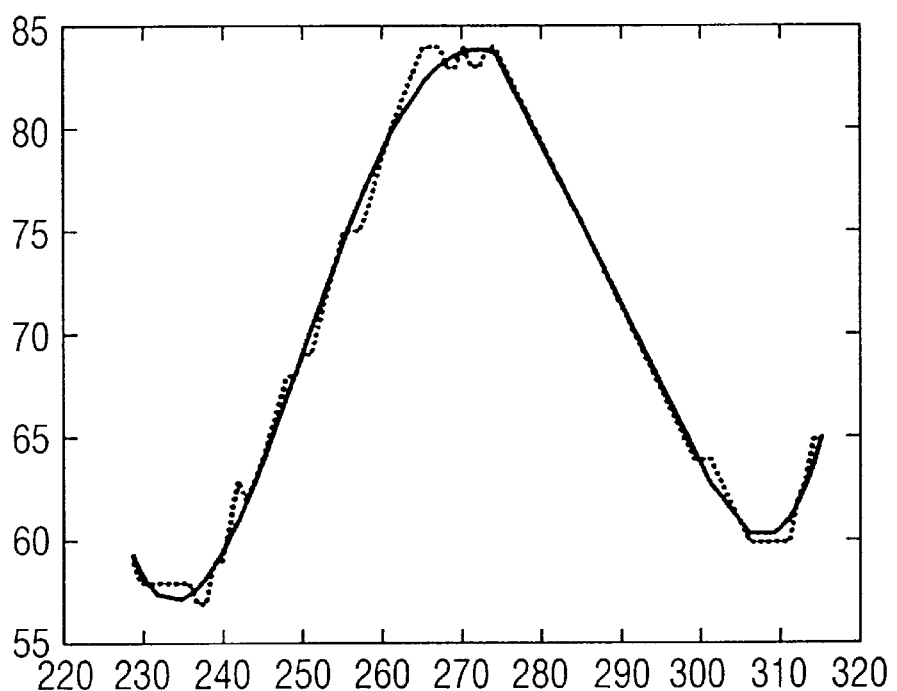
FIG. 6 is a graph of a polynomial of the fourth order.

On the basis of the Gaussian technique of the smallest error squares, the three aforedescribed extreme values may be used for a regression of the polynomial function which corresponds very well to the profile actually measured. In FIG. 6 a computed polynomial graph (solid line) is positioned above a measured profile (dotted line). The abscissa indicates the lines and the ordinate the numbers of the columns.

The regression is preferably performed in four iterative steps. During the first iteration the regression is performed over all contour points found. Faulty contour points become clearly apparent, which are due to the occurrence of reflections and which must be eliminated in order to permit a precise regression. In the second step of iteration regression is performed over the remaining measured values. 4 iterations are necessary in order to achieve a stable regression.

To be able to determine the intended three-dimensional shape of the spectacle frame groove it is necessary to calibrate the measuring system and particularly the light source and the detector unit. The relative position of the CCD camera and the laser is defined by calibration parameters. Using the known parameters it is then possible to compute 3D co-ordinates of the object under measurement by a transformation of the extracted 2D image co-ordinates. Possible deviations of the sensor and the measuring structure from an ideal condition must also be determined additionally in order to be able to perform measurements with an improved accuracy.

The transformation of sensor co-ordinates into world co-ordinates is not unambiguous because the world co-ordinates can be computed only when the laser plane is used for each point projected on the sensor of the CCD matrix camera. The transformation of the device-dependent image co-ordinates into world co-ordinates comprises the following steps:

1. computation of the distorted image co-ordinates
2. computation of the non-distorted image co-ordinates
3. computation of two points $P_1(x_{w1}, y_{w1}, z_{w1})$ and $P_2(x_{w2}, y_{w2}, z_{w2})$ which are located on the imaging ray of the image point, by the definition of two optional $z_w$ values
4. computation of the point of intersection between the laser plane and the imaging ray.

Finally, the point of intersection between the laser plane and the imaging ray represents the contour point in the world co-ordinate system which is searched.

For the implementation of the following transformation the following specific parameters of the measuring camera must be determined by the time of camera calibration.

$(c_x, c_y)$ origin of the image co-ordinate system $$d'_x = d_x \frac{N_{cx}}{N_{fx}} \text{ distance of adjacent pixels in an image line}$$

$d_x$ distance of adjacent sensor elements in the x-direction
$d_y$ distance of adjacent sensor elements in the y-direction
$N_{cx}$ number of the sensor elements in the x-direction
$N_{fx}$ number of the pixels in an image line Starting out from the co-ordinates $(x_f, y_f)$, which correspond to extreme values such as $P_1$ and which are extracted in the image co-ordinate system of the sensor plane of the detector unit, so-called "distorted" image co-ordinates $x_d$ and $y_d$ are computed:

$$x_d = \frac{(x_f - c_x) \cdot d'_x}{s_x}, \quad y_d = (y_f - c_y) \cdot d_y$$

"Distorted" as used above denotes in this sense that the sensor varies from an ideal model as a result of an incorrect chip geometry. These variations are defined in an appropriate manner by a calibration process, they are reduced, and result in the "non-distorted" co-ordinates ($x_u$, $y_u$):

$$x_u = x_d(1 + \kappa_1(x^2_d + y^2_d)), \quad y_u = y_d(1 + \kappa_1(x^2_d + y^2_d))$$

On account of the performed calibration it is possible to compute a rotational matrix R as well as a translational vector T. With R and T the position of the detector unit in space is determined in a world co-ordinate system. Each point on the detector plane or on the chip, respectively, therefore corresponds to one imaging ray. In mathematical terms, this imaging ray can be defined by the following equations:

$$x_w = \frac{((r_2 r_9 - r_3 r_8) y_u + (r_6 r_8 - r_5 r_9) x_u - c r_2 r_6 + c r_3 r_5) z_w}{(r_1 r_8 - r_2 r_7) y_u + (r_5 r_7 - r_4 r_8) x_u - c r_1 r_5 + c r_2 r_4} +$$
$$\frac{(r_2 T_z - r_8 T_x) y_u + (r_8 T_y - r_5 T_z) x_u - c r_2 T_y + c r_5 T_x}{(r_1 r_8 - r_2 r_7) y_u + (r_5 r_7 - r_4 r_8) x_u - c r_1 r_5 + c r_2 r_4};$$

$$y_w = \frac{((r_1 r_9 - r_3 r_7) y_u + (r_6 r_7 - r_4 r_9) x_u - c r_1 r_6 + c r_3 r_4) z_w}{(r_1 r_8 - r_2 r_7) y_u + (r_5 r_7 - r_4 r_8) x_u - c r_1 r_5 + c r_2 r_4} +$$
$$\frac{(r_1 T_z - r_z T_x) y_u + (r_7 T_y - r_4 T_z) x_u - c r_1 T_y + c r_4 T_x}{(r_1 r_8 - r_2 r_7) y_u + (r_5 r_7 - r_4 r_8) x_u - c r_1 r_5 + c r_2 r_4};$$

Only the point of intersection of this imaging ray with the laser plane determines a height co-ordinate. The point of intersection can be computed when the following equation is used:

$$\begin{pmatrix} x_a \\ y_a \\ z_a \end{pmatrix} = \begin{pmatrix} x_{w1} \\ y_{w1} \\ z_{w1} \end{pmatrix} + t \begin{pmatrix} x_{w2} - x_{w1} \\ x_{w2} - x_{w1} \\ x_{w2} - x_{w1} \end{pmatrix}$$

$$t = \frac{-(a_1 x_{w1} + b_1 y_{w1} + c_1 z_{w1} + d_1)}{a_1 (x_{w2} - x_{w1}) + b_1 (x_{w2} + x_{w1}) + c_1 (x_{w2} - x_{w1})}$$

The parameters indexed with L determine the laser plane. For a simplification of the above formalism initially two optional values were used for $z_w$ so that two points are obtained on the imaging ray which define a straight line. The parameter t determines the point of intersection of the laser plane with the imaging ray.

Now the measuring series of the individual contour points $P_1$, $P_2$ and $P_3$ are known, and moreover the position of the axis of rotation in the world co-ordinate system and the respective angle of rotation, of 0.1° for instance. It is established that the first triplet of measuring points is located at 0°. Each following triplet is further rotated through 0.1°:

$$x_{kw} = x_w \cos \beta - y_w \sin \beta$$

$$y_{kw} = -x_w \sin \beta + y_w \cos \beta$$

$$z_{kw} = z_w$$

$$\beta = 0°, 0.1°, 0.21, \ldots, 360°$$

Figure 7:
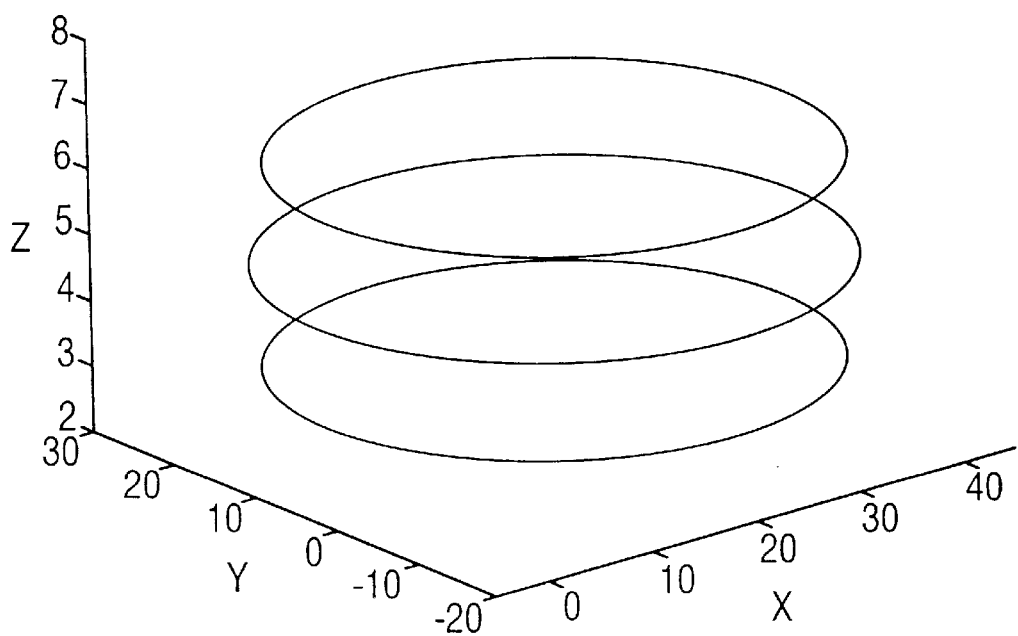
FIG. 7 shows the spectacle frame groove in world co-ordinates.

The measured values so obtained are stored as the results of the measurement of the inside contour and furnish the three-dimensional shape of the spectacle frame groove, as is illustrated by three three-dimensional curves in the 3D graphic chart in FIG. 7.

Figure 8:
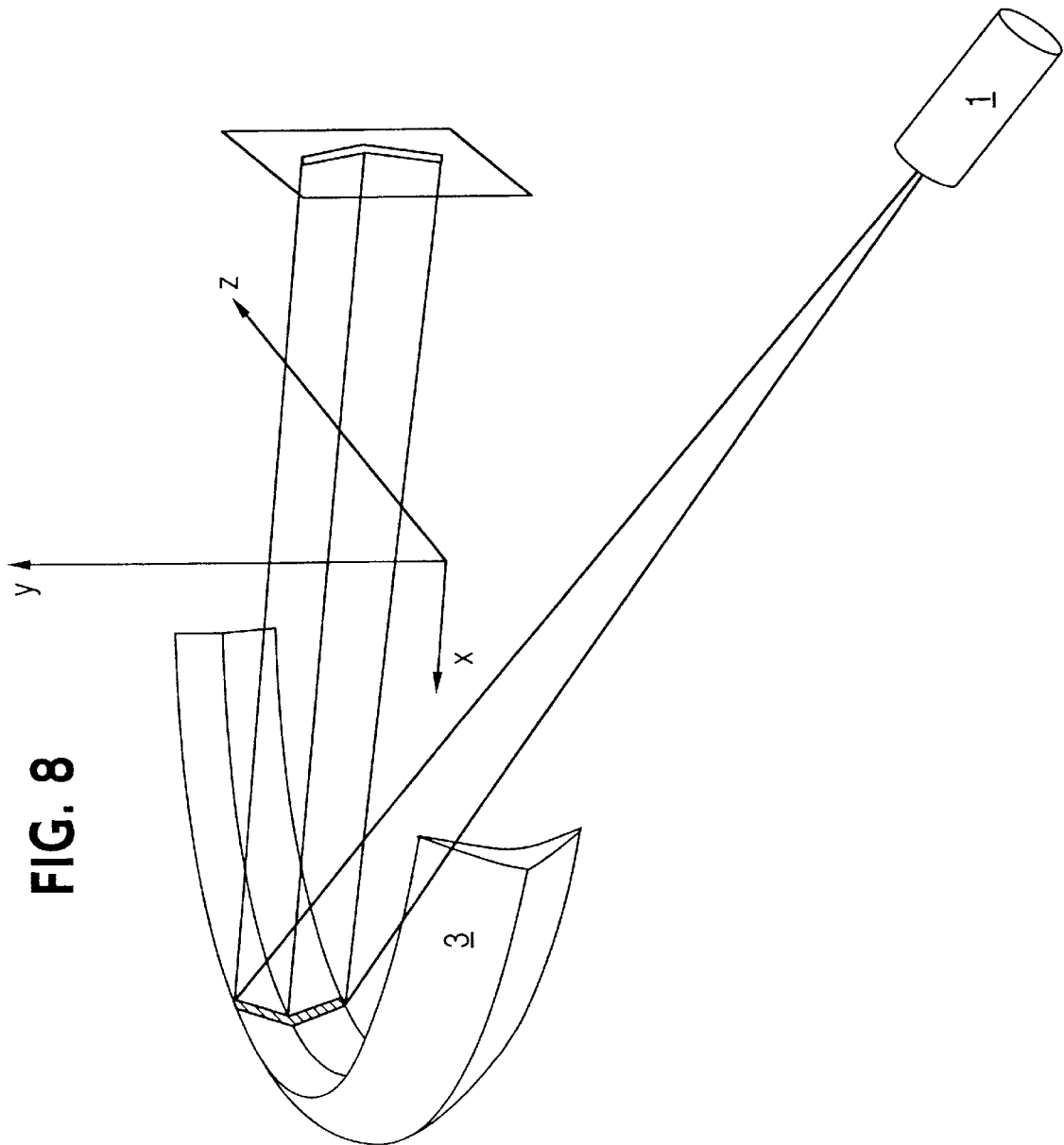
FIG. 8 is a schematic illustration relating to the light section method with light plane

FIG. 8 illustrates again a schematic drawing of the measuring system for the application of the triangulation principle. The light source 1 illuminates the spectacle frame 3 with a linear radiation field which is reflected on the spectacle frame 3. In an ideal case the light plane represents a YZ plane which is merely rotated about the axis of rotation (here the y-axis). If necessary, the light plane may also be shifted about all three translational directions so that the light plane establishes a dominant triangulation angle relative to the YZ plane.

| LIST OF REFERENCE NUMERALS | |
|---|---|
| 1 | light source |
| 2 | detector unit |
| 3 | holding device, turntable |
| 4 | spectacle frame |
| 5 | fixing device |
| 6 | light beam |
| 7 | deflector system |
| 8 | spectacle frame groove |
| 9 | imaging system |
| L | laser source |
| M | object under measurement |

What is claimed is:

1. A measuring system for the non-contacting detection of the three-dimensional shape of a groove peripherally extending in a spectacle frame, comprising a light source directing its light beam onto the groove, an optical imaging system which projects the light reflected at the groove onto an optical detector unit and which is disposed in a largely centred position relative to the groove to be measured on the spectacle frame, a holder supporting the spectacle frame, which is supported for rotation relative to the light source, the detector system and the optical imaging system about a centring axis of a surface inscribed by the peripheral groove of the spectacle frame, as well as an evaluation unit for determining the three-dimensional shape of the groove, wherein the source of light will illuminate the groove with a single beam of linear configuration, that an optical deflector system is provided which deflects the light beam from the light source onto the groove in such a way that the linear beam is directed largely orthogonally onto the surface inscribed by the peripheral groove in the spectacle frame, and that the light source and the detector system enclose a triangulation angle relative to the groove to be measured, which can be invariably pre-determined, so that the application of the light section technique will be possible for the detection of the three-dimensional shape of the groove.

2. A measuring system according to claim 1, wherein said light source is a laser.

3. A measuring system according to claim 1, wherein said optical deflector system and said optical imaging system are configured to constitute a single unit.

4. A measuring system according to claim 3, wherein the single unit is a 90° deflecting prism or a mirror.

5. A measuring system according to claim 1, wherein said light source and said detector unit are disposed in a side-by-side relationship and that the light beam of said light source is directed onto the area inscribed by said peripheral groove of the spectacle frame in a direction largely orthogonal, and is adapted to be deflected onto said groove by said optical deflector unit.

6. A measuring system according to claim 1, wherein said optical deflector unit is so oriented that the light beam is incident on said groove at an angle, preferably at an angle of 45°.

7. A measuring system according to claim 1, wherein said holder is a turntable.

8. A measuring system according to claim 1, wherein said optical imaging system is disposed in the plane of the area inscribed by said peripheral groove of the spectacle frame, and rests relative to the spectacle frame adapted to be rotated.

9. A measuring system according to claim 1, wherein said holder provides for an adjustment device such that the spectacle frame can be oriented relative to said optical imaging system such that said imaging system is oriented relative to said peripheral groove in a largely centred position.

10. A measuring system according to claim 1, wherein said detector unit is a CCD measuring camera.

11. A measuring system according to claim 10, wherein said CCD measuring camera is a matrix camera which presents light sensors disposed in lines and columns.

12. A measuring system according to claim 1, wherein said holder is adapted to be rotated in a cycled manner through a defined angle relative to said light source, said optical imaging unit and said detector unit.

13. A measuring system according to claim 1, wherein said evaluation unit detects the angle of rotation of said holder for each position of said spectacle frame relative to said light beam, and evaluates the light reflected on said groove for each rotational position.

14. A measuring system according to claim 1, wherein said holder or said optical deflector and imaging unit is adapted for travelling along a direction orthogonal on the area inscribed by the by course of said groove.

15. A measuring system according to claim 14, wherein a sensor is provided which detects the horizontal orientation between the light beam directed onto said groove and said groove, and that a controller is provided which aligns the light beam directed onto said groove relative to the groove.

16. A method of non-contacting detection of the three-dimensional shape of a groove peripherally extending in a spectacle frame and presenting two groove edges extending in parallel as well as a groove bottom, comprising the steps of operation:

illuminating the groove with a linear radiation field, detecting the radiation reflected on the groove by means of a detector unit with local resolution, detecting the three-dimensional position of areas on said detector unit which correspond each to the image of the groove edges and the bottom of the groove, determining the co-ordinates in space of both groove edges and of the bottom of the groove on the basis of the light section technique, regression of a polynomial curve for representing a sectional profile of said groove in the illuminated linear area, stepwise shift of the linear radiation field relative to the groove until largely all areas of the groove have been detected in the aforementioned manner, combining all sectional profiles so determined to form a three-dimensional shape of the groove.

17. A method according to claim 16, wherein the relative three-dimensional position between said detector unit and said light source is so determined that a definable triangulation angle $\gamma$ is inscribed by a light beam incident on said groove and by a light beam reflected on said groove.

18. A method according to claim 16, wherein the determination of the co-ordinates of said groove edges and the bottom of said groove in space the image of a light section through said groove on said detector unit is determined, for which the following relationship applies in correspondence with the light section technique:

$$\Delta x = \frac{b}{z}\sin\gamma \cdot \Delta z$$

wherein: $\Delta x$ relative distance of two groove points in the detector plane $\Delta z$ relative distance of two groove points on the real groove contour b/z imaging scale z object spacing between the light source and the groove $\gamma$ triangulation angle.

19. A method according to claim 16, wherein the image of the groove section illuminated by said linear radiation field, which is produced by said local-resolution detector unit, is evaluated by lines in such a way that a search is performed in each detector line for intensity edges.

20. A method according to claim 19, wherein two intensity edges $Fl_1(z)$ and $Fl_2(z)$, which are found in one detector line, a mean value $F_M$ is produced in correspondence with the following relationship:

$$F_M = \frac{k_{M1}Fl_1(z) + k_{M2}Fl_2(z)}{2}$$

wherein: $k_{M1}$, $k_{M2}$ are material-specific factors depending on the degree of reflection and absorption; $k_{M1} \approx 1$ and $k_{M2} \approx 1$ for metal spectacle frames, $k_1 \approx 2$ and $k_{M2} \approx 0$ for synthetic spectacle frames.

21. A method according to claim 20, wherein mean values among all mean values $F_M$ of a sectional profile of said groove, which correspond to the two mutually opposing groove edges as well as to the bottom of the groove.

22. A method according to claim 21, wherein co-ordinates of the images of said groove edges and of the bottom of the groove, which are related to the detector plane, are converted by a co-ordinate transformation into three-dimensional co-ordinates with consideration of distortions which are due to production-inherent detector variations.

23. A method according to claim 16, wherein a regression of a polynomial function of the fourth order is performed on the established three-dimensional co-ordinates of the two groove edges and of the bottom of the groove.

* * * * *